United States Patent [19]

Miyake

[11] Patent Number: 5,572,514
[45] Date of Patent: Nov. 5, 1996

[54] SPREAD SPECTRUM COMMUNICATION SYSTEM CAPABLE OF DETECTING OCCUPYING STATE OF CHANNEL BY OFF-COMMUNICATION TERMINAL

[75] Inventor: Masayasu Miyake, Fuchu, Japan

[73] Assignee: Casio Computer Co., Ltd., Tokyo, Japan

[21] Appl. No.: 268,832

[22] Filed: Jun. 29, 1994

[30] Foreign Application Priority Data

Jun. 30, 1993 [JP] Japan ................................. 5-160743

[51] Int. Cl.$^6$ ................................................ H04J 13/04
[52] U.S. Cl. .................................................. 370/17; 370/18
[58] Field of Search ................................. 370/18, 13, 17, 370/69.1; 375/200, 201, 205, 206; 455/33.1; 379/59, 63

[56] References Cited

U.S. PATENT DOCUMENTS 5,402,413  3/1995  Dixon ........................................ 370/18
5,420,850  5/1995  Umeda et al. ............................ 375/205

OTHER PUBLICATIONS

Dong-In Kim, "Multiple-Capture Performance of a Common Code DS/SSMA Packet Radio System", IEEE Global Telecommunications Conference 1993.

Primary Examiner—Douglas W. Olms
Assistant Examiner—Min Jung
Attorney, Agent, or Firm—Frishauf, Holtz, Goodman, Langer & Chick

[57] ABSTRACT

Assuming that 4-system communication with signals A, B, C and D is executed for each frame and one period consists of four frames for the signals A, B, C and D, and signals AS, BS, CS and DS, modulated with spread codes representing the systems to which the signals belong are inserted, a terminal which is about to start communication sequentially tunes the reception frequency to frequencies 1, 2 and 3, detects the signals AS, BS, CS and DS, modulated with the common spread codes, from the received signals per frame over more than one period, acquires the signal levels then, determines from the results of those sequential processes how many spread spectrum signals occupy each frame, and selects the optimal frequency channel that has the least radio interference. It is therefore possible to detect the occupying state of a communication channel and prevent communication from being disabled by an interference signal.

20 Claims, 9 Drawing Sheets

SPREAD SPECTRUM COMMUNICATION SYSTEM CAPABLE OF DETECTING OCCUPYING STATE OF CHANNEL BY OFF-COMMUNICATION TERMINAL

BACKGROUND OF THE INVENTION

1. Field of the Invention

The present invention relates to a communication system which employs a spread spectrum system, particularly, a direct sequence (DS) system.

2. Description of the Related Art

A spread spectrum communication system allows a plurality of users to share a single wide frequency band on the time and spatial basis upon executing communication. Attentions have been paid to such a spread spectrum communication system as a future communication system since it has a large system capacity per a bandwidth. However, when many terminals are installed in a communication network adopting such a spread spectrum communication system, a plurality of frequency channels (or time slots) are prepared and the number of communication signals to be retained in each frequency channel (or each time slot) is restricted, as in an ordinary communication system. Therefore, in order to start a new communication at each terminal, it is important to know in advance the number of spread spectrum signals that occupy the frequency channel (or the time slot) to be used.

In a common communication system, the CNR (Carrier to Noise Ratio) of a signal to be received is set equal to or greater than 10 dB. In such a common communication system, therefore, it is possible to determine whether or not a communication channel is occupied by detecting the level of the received carrier wave.

However, in the communication system employing the spread spectrum system, particularly, employing the DS system, the CNR of a received signal is used in the negative region. That is, in the communication system employing the DS system, a frequency bandwidth of the transmission signal is spread with a spread code over a frequency bandwidth that is sufficiently wider than a narrowest frequency bandwidth required for transmitting necessary information so that a power level of a transmission signal is set equal to or less than a noise signal level. Thus, the occupying state of a frequency channel (communication channel) cannot be detected by detecting the level of the received carrier wave (reception signal) in the spread spectrum communication system.

In order to detect the spread spectrum signal in the frequency channel at the receiver side in the spread spectrum communication system, it is necessary to conduct an inverse spread process with a spread code which is identical to the spread code used in the transmitter side. Since the received signal which is subjected to the spread spectrum process is processed with the inverse spread process to have a narrow bandwidth, the spread spectrum signal can be detected by detecting a signal level after the inverse spread process is conducted. Normally a spread code used in communication, i.e., a spread code used in the spread spectrum process of the transmission signal is associated with a specific number assigned to each terminal installed in the conventional spread spectrum communication system. Therefore, to detect the occupying state of the frequency channel at each terminal, it is necessary to allow each terminal to store the spread codes of all the terminals that utilize the same frequency channel. However, in the conventional spread spectrum communication system, it is to actually accomplish this detection. Further, the conventional spread spectrum communication system has a drawback that it is hard to keep a secret of communication content.

As described above, since it is difficult to detect the occupying state of a frequency channel in the conventional spread spectrum communication system, an interference signal is likely to be produced in communication between terminals in each system, thus disabling signal reception. This drawback is readily caused in an equal distributed system in which equal roles and functions are assigned to each terminal comprising the communication network.

FIG. 1 illustrates two spread spectrum communication systems of equal distributed type adjacent to each other. A communication system 1 comprises terminals 101, 102 and 103, and a communication system 2 comprises terminals 201 and 202. The terminals 101–103, 201 and 202 used in those systems 1 and 2 all have the same structure and functions, except for a system number specific to each system and a terminal number specific to each terminal. Those communication systems 1 and 2 may correspond to neighboring different users, for example, who purchased a plurality of terminals provided by the same manufacturer and may comprise independently their communication systems. In this case, it is assumed that the terminal 102 of the communication system 1 and the terminal 202 of the communication system 2 are used in close areas separated by a partition, a wall or the like. If the terminal 201 in the system 2 starts transferring information to the terminal 202 under the circumstance where the terminal 101 in the system 1 is transmitting information and the terminal 102 is receiving the information in FIG. 1, the transmission signal to the terminal 202 may also reach the nearby terminal 102 which is currently receiving the information and may be received as an interference signal. Under this situation, if the transmission distance between the terminals 101 and 102 is long and the received signal at the terminal 102 is weak, the communication at the terminal 102 may become disabled by the interference signal.

Since it is difficult to detect beforehand the occupying state of a frequency channel at each terminal in the conventional spread spectrum communication system, an interference signal is easily produced in communication between terminals of the system. If the transmission distance is large and the received signal is weak, in particular, the signal communication is disabled.

SUMMARY OF THE INVENTION

It is therefore an object of the present invention to provide a spread spectrum communication system which can detect the occupying state of a communication channel and can thus surely prevent communication from becoming disabled by an interference signal.

According to an aspect of the present invention, there is provided a spread spectrum communication system for allowing a plurality of terminals to share a single wide frequency band on a time and spatial basis in executing communication, each terminal periodically inserting a communication signal, undergone spread modulation with a common spread code representing a system to which the terminal belongs, the other terminals in the system being capable of detecting a communication signal, modulated with the common spread code, from a received signal and detecting the number of spread spectrum signals occupying each communication channel from a result of the detection of the communication signal.

According to the present invention, therefore, a terminal that is about to start communication can know the occupying state of each communication channel by detecting the number of spread spectrum signals that occupy each communication channel from the result of the detection of a communication signal modulated with a common spread code, and can select a highly-reliable communication channel which is less occupied by other communication signals in executing communication.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will now be described hereinafter with reference to the accompanying drawings.

Figure 1:
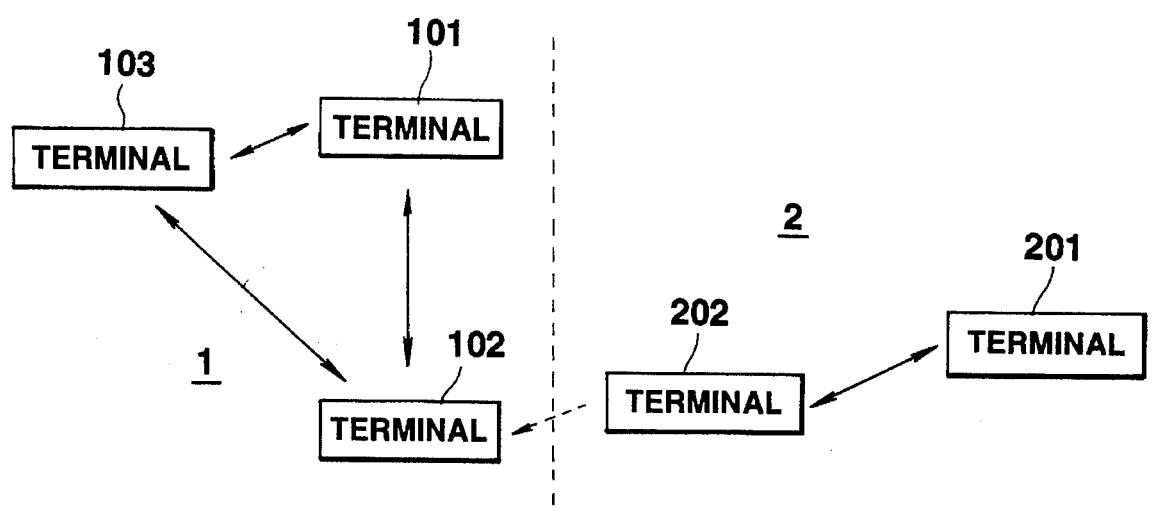
FIG. 1 is a diagram illustrating an example of a conventional communication system which causes a radio interference.

First, a first embodiment of the spread spectrum communication system of the present invention will be discussed with reference to FIG. 2. In the spread spectrum communication system of the present invention, the schematic structure of which is shown in FIG. 1, the terminal in communication transmits signals subjected to the spread modulation with the spread code specific to the destination terminal, and also transmits periodically signals subject to the spread modulation with common spread codes at appropriate intervals. The common spread codes are common to either a plurality of terminals in the communication system to which that terminal belongs or a plurality of terminals which have the same usable frequency channels as that terminal. Other terminals in off-communication with that terminal can receive such signals which are spread-modulated with common spread codes.

Figure 2:
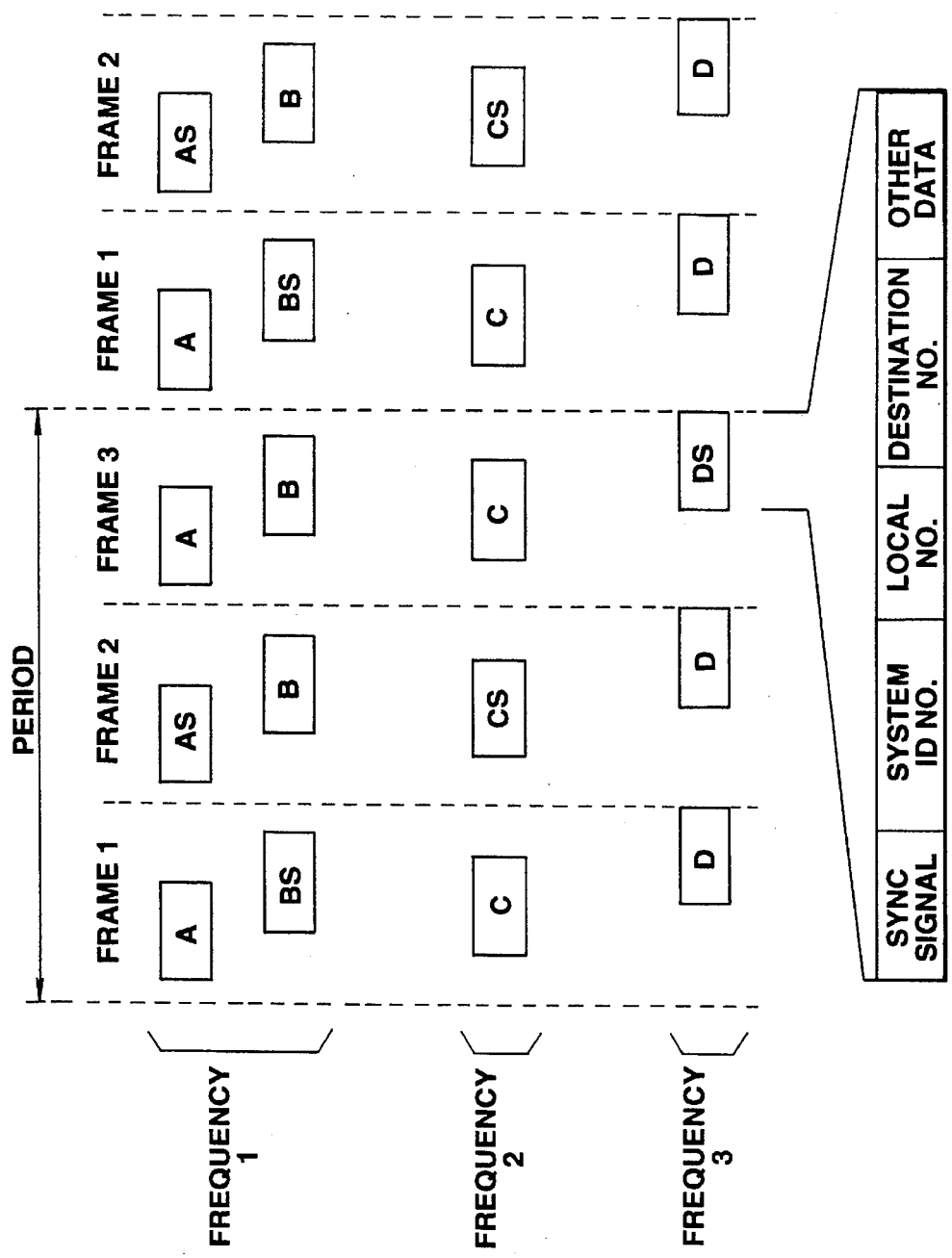
FIG. 2 is a diagram for explaining a first embodiment of the present invention.

FIG. 2 shows a terminal of the first embodiment which has three usable frequency channels, for example. In FIG. 2, 4-system communication with signals A, B, C and D is executed per frame. One period consists of three frames for the signals A, B, C and D. Signals AS, BS, CS and DS, modulated with common spread codes are inserted. Each of the signals AS, BS, CS and DS (only the signal DS is shown in detail in FIG. 2) has, as information, a sync signal for bit synchronization or frame synchronization, a system identification number, a local number, destination number and other data. The "other data" here indicates data attribute determined by the system. An identification information which indicates whether the data is a voice signal or a data signal, or an analogue signal or a digital signal, and the amount of data etc. are considered as other data in this case.

A terminal in off-communication, especially, a terminal which is about to start communication first tunes the reception frequency to frequency 1, then detects the signals AS and BS, modulated with the common spread codes, from the received signals per frame over more than one period. When appropriate signals are detected, such terminal stores the levels of such signals and, when there is no appropriate signal, such terminal stores that event. Similar processings are performed for frequencies 2 and 3. The terminal in off-communication can determine from the results of those sequential processes how many spread spectrum signals occupy each frame, and can select the optimal frequency channel that has the least interference based on the result of the determination. The terminal which is about to start communication can select the frequency channel having the least possibility of radio interference as a communication line based on the above observance of how the frequency channels are used. Then, the terminal sends a system number representing the belonging system, a local number and a communication destination number after spread modulation with common spread codes. In particular, the signals to be subjected to spread modulation with common spread codes include the sync signal, system identification number, local number, destination number and other data.

The destination terminal executes a signal reception and detection process to detect the amount of radio interference and therefore can receive the signal which is spread-demodulated with the common spread code. When the destination terminal detects the local number among the received signals, undergone spread demodulation with the common spread codes, the terminal stays at that frequency channel and sends back an acknowledge signal to the terminal in the transmitter side and then starts communication.

Then, embodiments of circuit structures of the terminal comprising the communication system of the present invention will be discussed hereinafter with reference to FIGS. 3 to 5.

Figure 3:
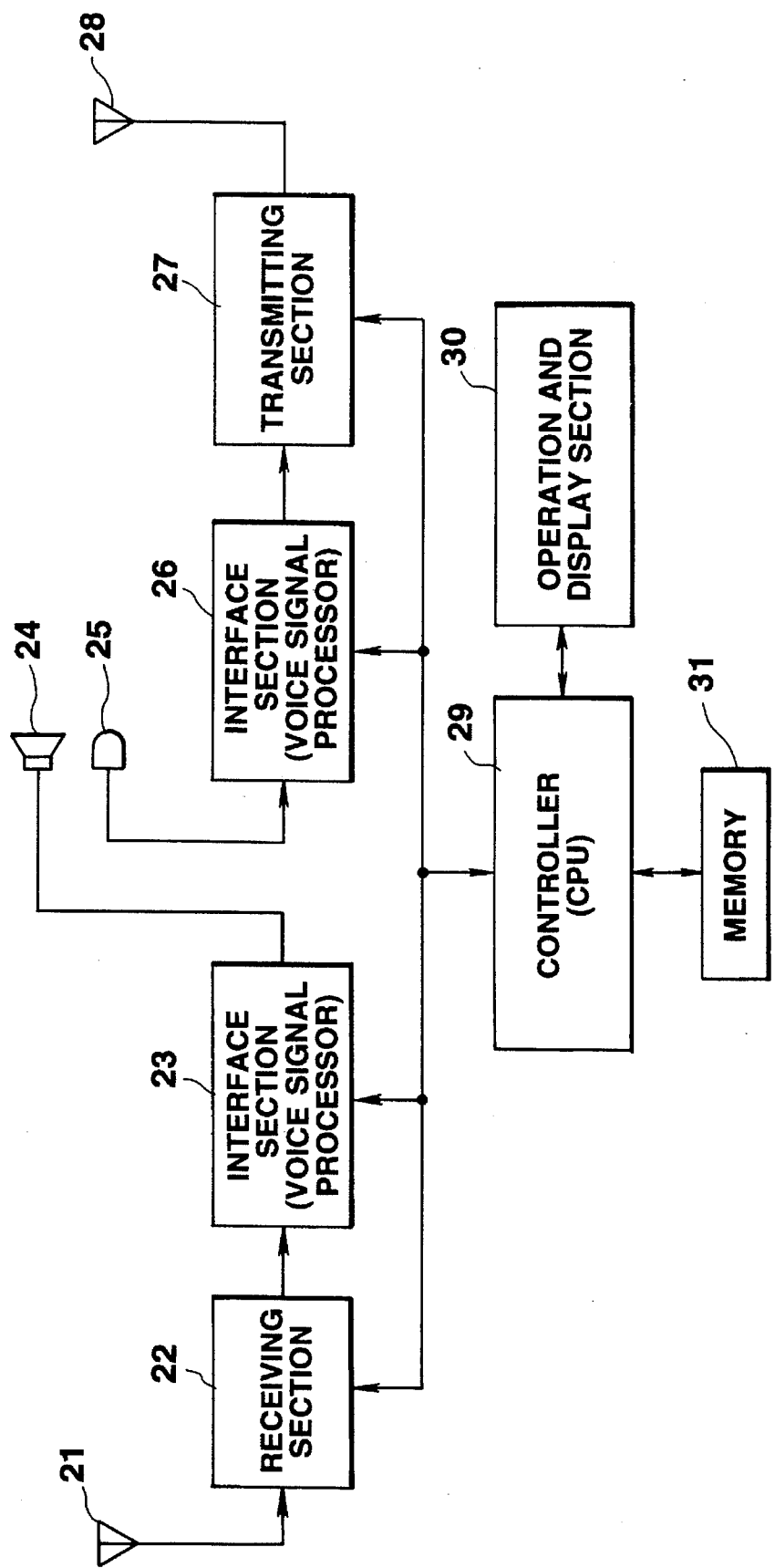
FIG. 3 is a diagram showing the schematic structure of a general circuit of the communication system of the present invention.

FIG. 3 shows a schematic structure of a general circuit of the communication system of the first embodiment of the present invention. The communication system comprises a reception antenna 21 for receiving radio signals subjected to the spread spectrum process, a receiving section 22 for detecting and demodulating the radio signals received by the reception antenna 21, an interface section (voice signal processor) 23 for properly processing the received signals when demodulated signals are voice signals and for outputting the processed signals to a speaker 24, a speaker 24 for generating voices from the voice signals sent from the interface section 23, a microphone 25 for converting the voices into the voice signals, an interface section (voice signal processor) 26 for properly processing the voice signals input from the microphone 25 and sending processed signals to a transmitting section 27, a transmitting section 27 for executing the spread spectrum modulation of the voice signals sent from the interface section 26 and other signals and sending the modulated signals to a transmission antenna 28, a transmission antenna 28 for transmitting the signals sent from the transmitting section 27 into the air, and a controller 29 for controlling the above sections. An operation and display section 30 which is provided with a key board and a display device, and a memory 31 composed of a RAM (Random Access Memory) etc. are connected to the controller 29. The receiving section 22 and the transmitting section 27 each has a structure with a distinctive feature of the present invention as shown respectively in FIGS. 4 and 5 together with their peripheral circuits.

Figure 4:
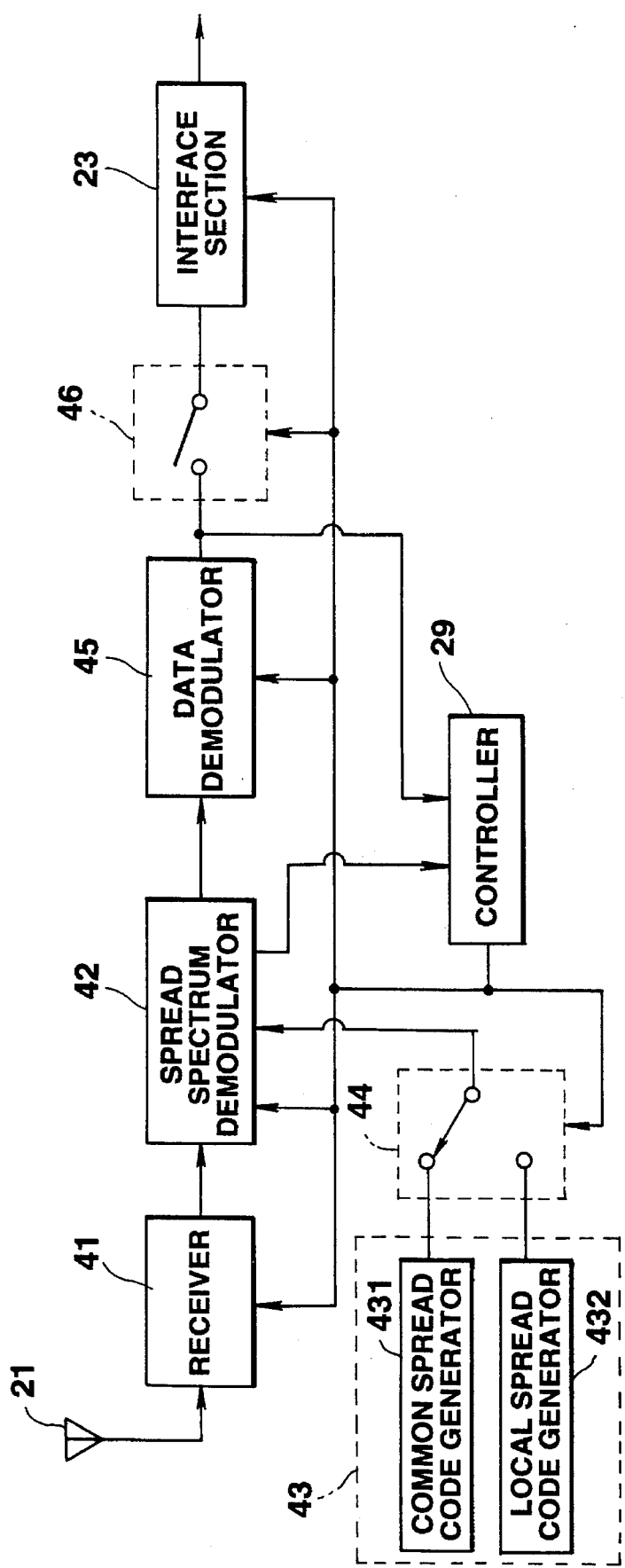
FIG. 4 is a diagram showing the schematic structure of a spread spectrum receiver in the first embodiment.

FIG. 4 shows a schematic structure of the receiving section 22 of the first embodiment of the present invention. First a circuit structure and functions of the receiving section 22 will be described below. As shown in FIG. 4, the receiving section 22 comprises a receiver 41, a spread spectrum demodulator 42, a code generator 43, a code selector 44, a data demodulator 45, and a signal selector 46. A signal received by the antenna 21 is sent to the receiver 41 where the signal is converted to a signal (IF signal) having the proper frequency band and level through the reception process. The frequency of the signal received at the receiver 41 is determined by the control signal from the controller 29. The IF signal from the receiver 41 is sent to the spread spectrum (SS) demodulator 42 where the signal is processed by an SS demodulation process (an inverse SS process). In this case, the spread codes that are used in the SS demodulation process in the SS demodulator 42 are those selected by the code selector 44 in response to the control signal from the controller 29. The code selector 44 receives a common spread code output from the common spread code generator 431 in the code generator 43 and a local spread code output from the local spread code generator 432. In response to the control signal from the controller 29, the code selector 44 selects one of the common spread code and the local spread code at the reception timing and outputs the selected code to the SS demodulator 42. The SS demodulator 42 supplies to the data demodulator 45 the demodulated signal which is a signal modulated by only the information signal and supplies level information of the demodulated signal to the controller 29. The data demodulator 45 demodulates the signal modulated by only the information signal and supplied from the SS demodulator 42 into the original signal. The data obtained by the data demodulator 45 is supplied to the signal selector 46 as well as to the controller 29. Under this situation, the controller 29 determines whether the received and demodulated data is voice data or not. When determining the received and demodulated data as the voice data, the controller 29 sends a control signal to the signal selector 46 to output the received and demodulated data to the speaker 24 shown in FIG. 3 via the interface 23. The controller 29 detects the sync signal, local number, destination number, etc. from the demodulated data, and performs control to check the radio interference level and to set the communication line based on both the detected information and the signal level information supplied from the SS demodulator 42.

Figure 5:
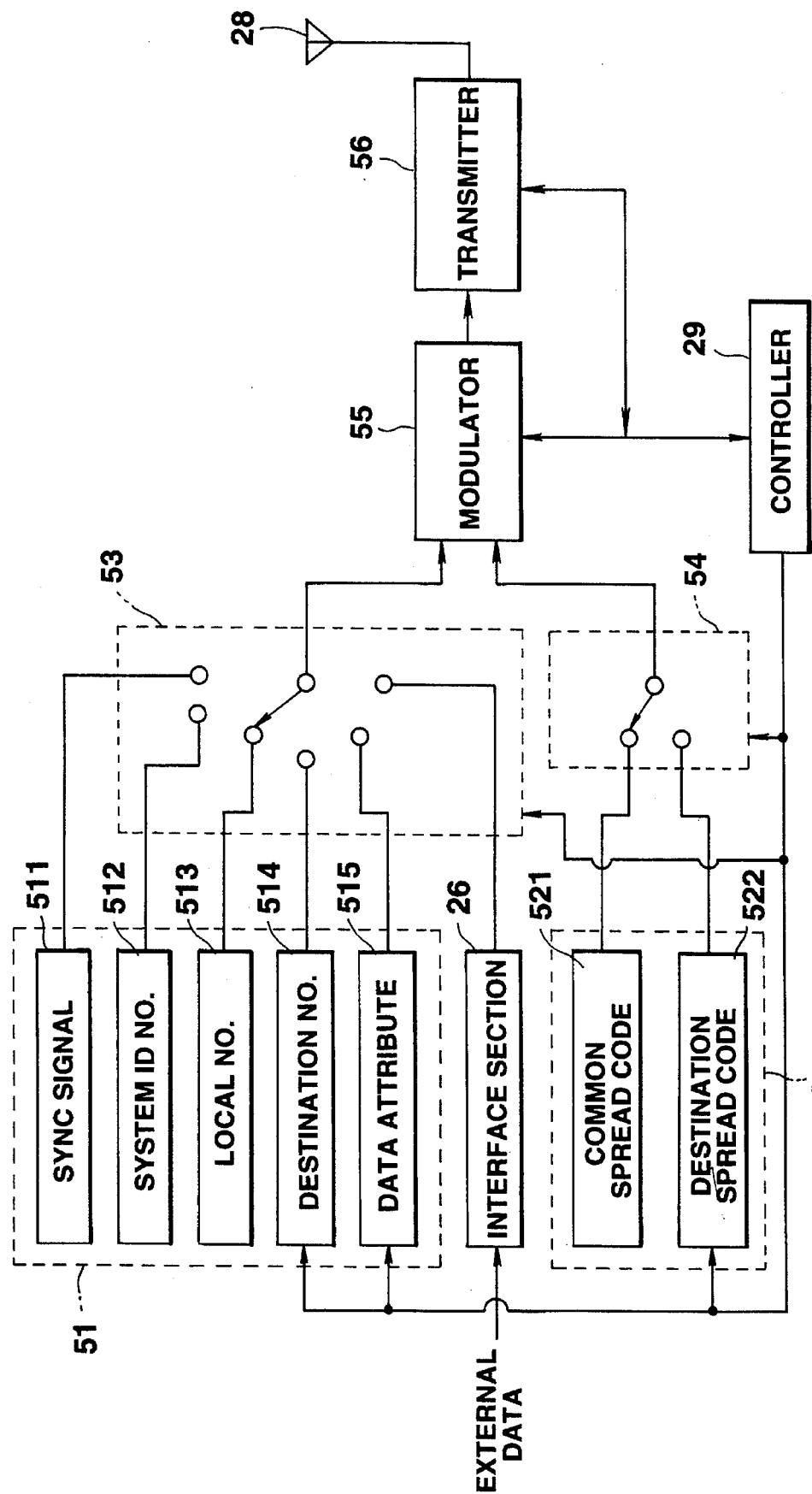
FIG. 5 is a diagram showing the schematic structure of a spread spectrum transmitter in the first embodiment.

FIG. 5 shows a schematic structure of the transmitting section 27 of the first embodiment of the present invention. Then a circuit structure and functions of the transmitting section 27 will be described below. As shown in FIG. 5, the transmitting section 27 comprises a signal generator 51, a code generator 52, a signal selector 53, a code selector 54, a modulator 55, and a transmitter 56. The signal generator 51 comprises a sync signal pattern storing portion 511, a system identification number storing portion 512, a local number storing portion 513, a destination number storing portion 514 and a data attribute storing portion 515. Individual informations stored in the storing portions 511 to 515 are output as signals. The destination number and the data attribute are set or altered by the controller 29 while the sync signal pattern, the system identification number and the local number are determined by the system or the apparatus itself and are not variable. The individual signals from the signal generator 51 are supplied to the signal selector 53. The signal to be transmitted which is composed of a single signal or a plurality of signals is sequentially selected among the individual signals as an output signal in response to the control signal from the controller 29. The external data, i.e., the voice signal input from the microphone 25 is supplied to the signal selector 53 via the interface section 26 and can also be selected as one of the signals to be transmitted. At the same time, the common spread code generator 521 and the destination spread code generator 522 in the code generator 52 generate spread codes. In this case, the common spread code is determined by the manufacturer of the terminals and is not variable, while the destination spread code is set and altered every communication by the controller 29. Those common spread code and destination spread code are supplied to the code selector 54. The code selector 54 selects one of the signals at the transmission timing in response to the control signal from the controller 29. The outputs of the signal selector 53 and the code selector 54 are simultaneously input to the modulator 55. The modulator 55 conducts the ordinary modulation which is executed based on the signal input from the signal selector 53 and the spread spectrum modulation which is executed based on the spread spectrum input from the code selector 54. The modulated output obtained by the spread spectrum modulation in the modulator 55 is subjected to frequency conversion, etc. in the transmitter 56, and is then transmitted in the air by the antenna 28. In this case, the frequency of the output of the transmitter 56 is determined by the control signal from the controller 29.

Figure 6:
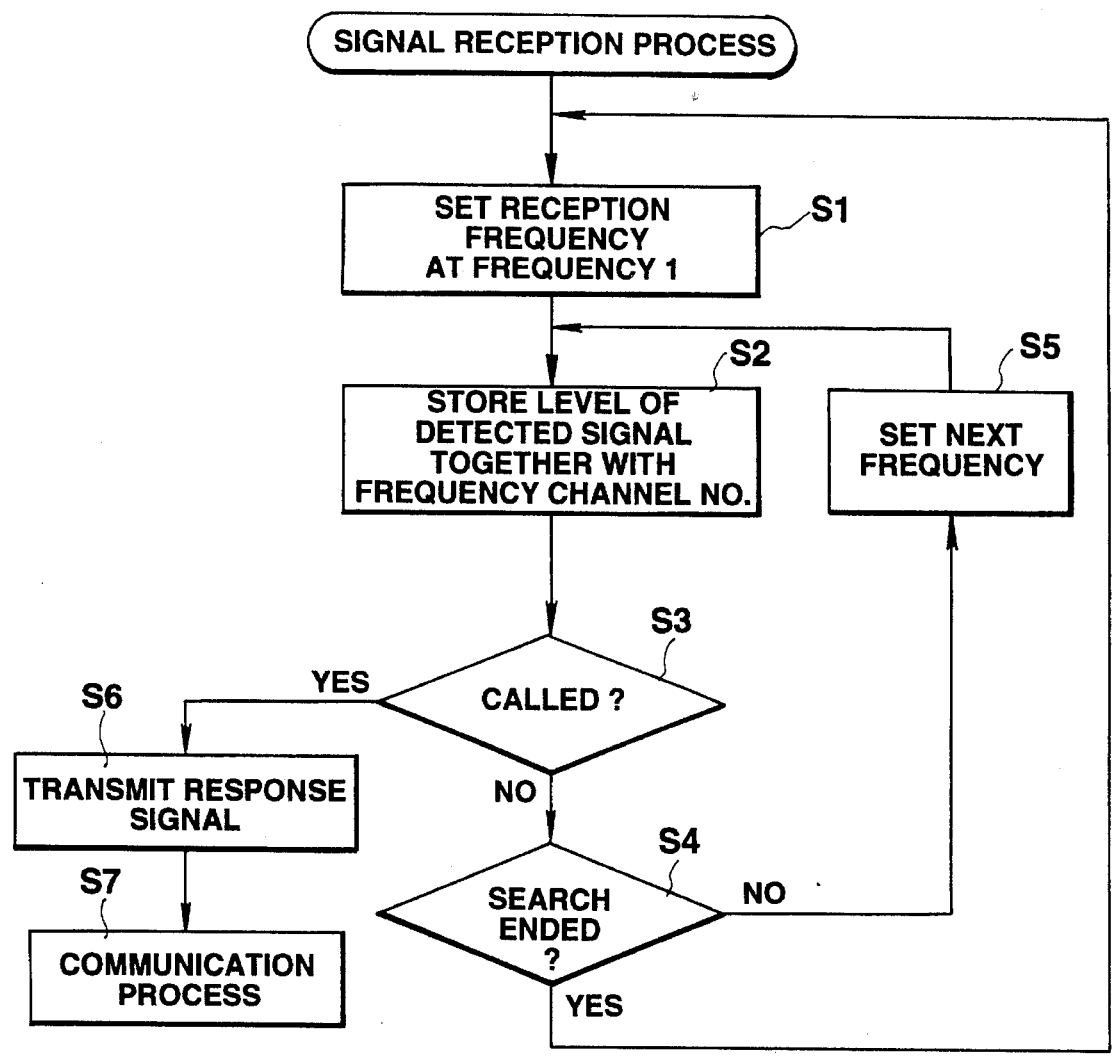
FIG. 6 is a flowchart illustrating a signal reception process conducted by the first embodiment which is in off-communication.

FIG. 6 is a flowchart illustrating a signal reception process conducted by the first embodiment which is in off-communication. Then, the signal reception process executed by the terminal of the first embodiment which is not in communication will be discussed with reference to FIG. 6. When the terminal of the first embodiment is not communicating with other terminals, it selects the common spread code as the spread code used for demodulating the spread spectrum signal. That is, the controller 29 controls the code selector 44 to Supply the common spread code generated by the common spread code generator 431 to the SS demodulator 42. Assume that the terminal of the first embodiment can use three frequencies in communication, as described in FIG. 2, first the reception frequency is set at the frequency 1 in FIG. 2 (step S1) and receives signals during more than one period in FIG. 2. If the signal modulated by the spread code which is the same as the spread code output from the common spread code generator 431 is received, the SS demodulator 42 outputs the signal obtained by demodulating the spread spectrum signal and the level information thereof. The modulated signal from the SS demodulator 42 is modulated into data in the data demodulator 45 and is then send to the controller 29. As described above, the sync signal, the system identification number, local number and destination number are included in the data from the data demodulator 45. The level information from the SS demodulator 42 is directly supplied to the controller 29.

The controller 29 makes the memory 31 store the level information supplied from the SS demodulator 42 as well as the number of the frequency channel set as the reception frequency at that time (the number is "1" here) (step S2). It is preferable that the number of the slot or time information in the slot in addition to the number of frequency channel should be stored in the memory 31. When such detailed informations are stored, as in the communication process in step S7 described later, the output timing for the SS signal modulated by the common spread code at that terminal can be surely set at a different output timing from that for the SS signal modulated by the common spread code at other terminal. The controller 29 always decides whether the destination number sent from the data demodulator 45 coincides with the local number, i.e., whether that local terminal is called (step S3). If it is decided in step S3 that the local terminal is not called, then it is decided in next step S4 whether a search for all the frequency channels is ended or completed, i.e., whether the frequency channels 1 to 3 are searched. Unless the search is ended, the next frequency is set as the reception frequency and then the process returns to the process in step S3 (step S5) while, if the search is ended, the process returns to step S1.

In the decision in step S3, if it is decided that the local terminal is called, the process proceeds to step S6 and the response signal is returned to the destination terminal. In detail, the response signal is transmitted in step S6 as follows. To begin with, the controller 29 sets the number of the transmitter terminal, which is received at the same time when the calling of that terminal is detected, to the destination number storing portion 514 in FIG. 5 and sets information indicating the response signal to the data attribute storing portion 515. Next, the controller 29 controls the signal selector 53 so as to output sequentially the sync signal, the system identification number, the local number, the destination number and the data attribute information, and controls the modulator 55 so as to conduct the SS modulation with the common spread code, outputting the resultant signal. When the transmission of the response signal is completed, the process proceeds to a communication process (step S7). In this case, the controller 29 controls the code selector 44 in FIG. 4 so as to send the spread code output from the local spread code generator 432 to the SS demodulator 42. At the same time, the controller 29 develops the local number of the transmitter side into the spread code according to a preset process and then sets the spread code in the destination spread code generator 522 in FIG. 5. The controller 29 also controls the code selector 54 in FIG. 5 such that the destination spread code generator 522 can supply the spread code to the modulator 55. Thus a communication having security function can be established between two terminals. In this communication process, it is apparent that the notice information which is subject to the spread spectrum process with the common spread code and comprises the sync signal, the system identification number, the local number, the destination number and the like, as described above, can be transmitted at a predetermined period.

In case each terminal used in this communication system is so constructed that the reception signal is demodulated with the local spread code after transmitting the calling signal, the number of the transmitter terminal is developed into the spread code according to a preset process, and then the spread code is set in the destination spread code generator 522 in FIG. 5. The controller 29 controls the code selector 54 in FIG. 5 so as to supply the spread code from the destination spread code generator 522 to the modulator 55, and thereafter the response signal is transmitted.

Figure 7:
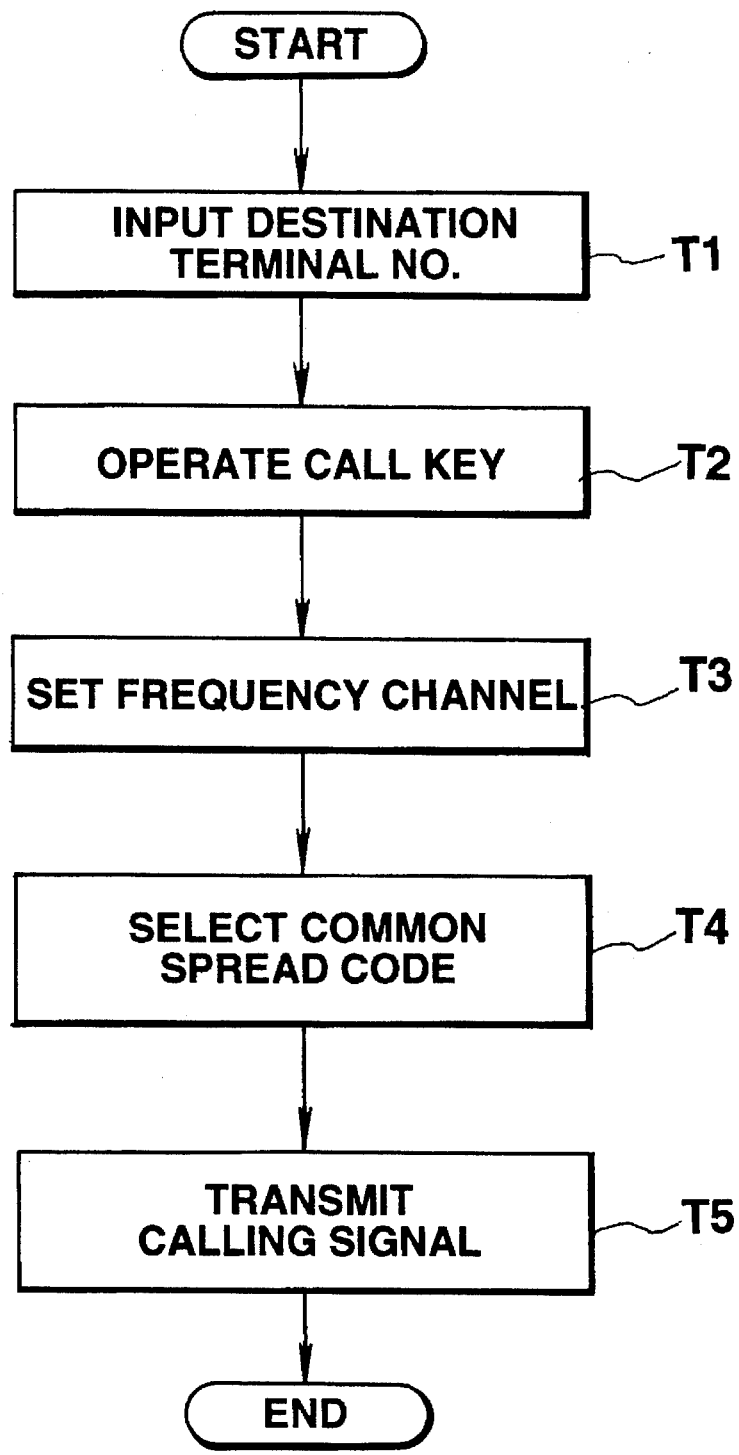
FIG. 7 is a flowchart illustrating a process conducted by the first embodiment which is about to start a new communication.

FIG. 7 is a flowchart illustrating a process conducted by the first embodiment which is about to start a new communication. First, the number of the destination terminal desired to communicate is input by the key board of the operation and display section 30 (step T1). The input number of the terminal is set in the destination number storing portion 514 in FIG. 5 by the controller 29. The spread code corresponding to the input number, which is obtained by a preset process conducted by the controller 29, is set in the destination spread code generator 522 in FIG. 5. The call key is then operated (step T2). According to the operation of the call key, the controller 29 sets information indicating the calling signal in the data attribute storing portion 515 in FIG. 5 and sets the transmitting frequency in the transmitter 56 (step T3). In this case, based on the frequency channel number or frequency channel information stored in step S2 in FIG. 6, the frequency having the least possibility of radio interference is selected and set as the transmitting frequency. Then the controller 29 selects the common spread code which is used as the spread code to conduct the spread spectrum in the modulator 55 (step T4) and transmits the calling signal which is SS-modulated with the common spread code and the process is completed (step T5). In particular, in the processes in steps T4 and T5, the controller 29 controls the code selector 54 so as to supply the spread code output from the destination spread code generator 522 to the modulator 55, and thereafter controls the signal selector 53 so as to output sequentially the sync signal, the system identification number, the local number, the destination number and the data attribute information to the modulator 55.

With the above, when the transmission of the calling signal is ended, the concerned terminal just waits until the response signal transmitted from the destination terminal. In this case, as described above, if the concerned terminal is so constructed that it have to use the local spread code in the demodulation process of the reception signal after it transmits the calling signal, the controller 29 controls the code selector 44 in FIG. 4 such that the spread code output from the local spread code generator 432 can be supplied to the SS demodulator 42.

Figure 8:
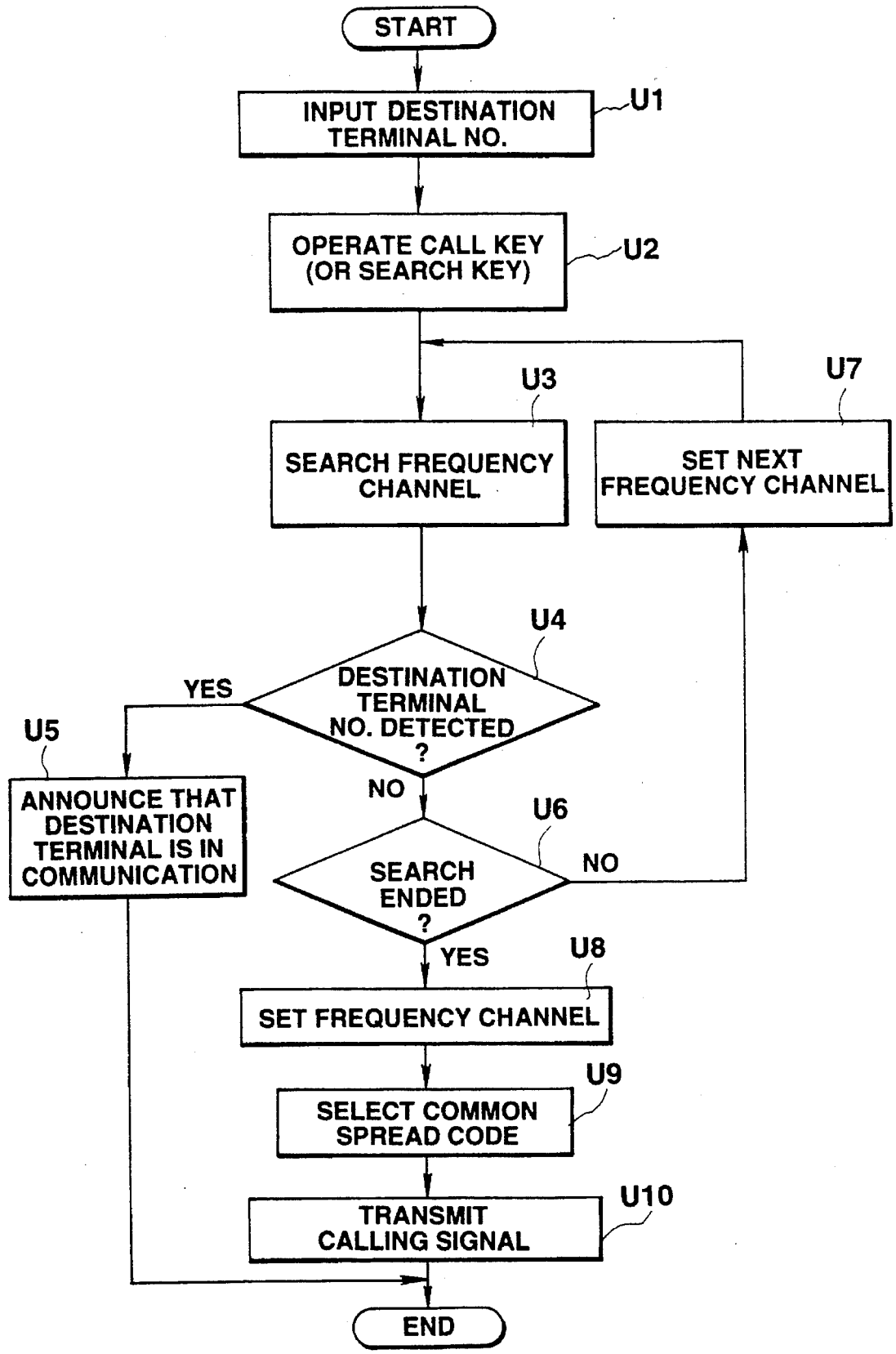
FIG. 8 is a flowchart illustrating another process conducted by the first embodiment which is about to start a new communication.

FIG. 8 is a flowchart illustrating another process conducted by the first embodiment which is about to start a new communication. First, the number of the destination terminal desired to communicate is input by the key board of the operation and display section 30 (step U1). The input number of the terminal is stored in the controller 29 or the memory 31 and is set in the destination number storing portion 514 in FIG. 5 by the controller 29. The spread code corresponding to the input number, which is obtained by a preset process conducted by the controller 29, is set in the destination spread code generator 522 in FIG. 5. The call key is then operated (step U2). According to the operation of the call key, the controller 29 sets information indicating the calling signal in the data attribute storing portion 515 in FIG. 5 and starts a search of the frequency channels (step U3). The search process of the frequency channels in step U3 is identical to that described in step S2 in FIG. 6. The level information of the demodulation signal of the SS signal (signal obtained by demodulating the SS signal) which is detected during when the signal is received over more than one period in FIG. 2, i.e., the level information of the demodulation signal of the SS signal modulated with the common spread code is stored in the memory 31 together with channel information including the number of the frequency channel and the number of time slot etc. This process is conducted at first to the frequency 1 in FIG. 2. Then the controller 29 determines whether or not the number of the destination terminal input in step U1 is included in the reception data sent from the data demodulator 45 (step U4). Specifically, in case the received signal is the signal which is modulated with the common spread code, the controller 29 determines whether the local number or the destination number demodulated in the data demodulator 45 and included in the notice information data which comprises the sync signal, the system identification number, the local number, the destination number etc. coincides with the terminal number input in step U1 (step U4). If it is determined YES in step U4, the process proceeds to step U5 to announce that the destination terminal is now in communication with the other terminal. This announcement is made by voice, sound or display. In the determination in step U4, if it is determined NO, it is determined whether a search for all the frequency channels is ended, that is, whether the frequency channels 1 to 3 are searched or not in step U6. Unless the search is ended, the process proceeds to step U7 where the next frequency is set as the reception frequency. Then the process returns to step U3 and the search process for the frequency channels is repeated. In this case, like the process in step S2 described in FIG. 6, the level informations of the demodulation signals for all the frequency channels are stored. When the search processes for all the frequency channels are completed, the process proceeds and the transmitting frequency is set in the transmitter 56 (step U8). The process in step U8 is the same as that in step T3 in FIG. 7. Based on the frequency channel number or frequency channel information stored in step U3, the frequency having the least possibility of radio interference is selected and set as the transmitting frequency. Then the controller 29 selects the common spread code which is used as the spread code to conduct the spread spectrum in the modulator 55 (step U9) and transmits the calling signal which is SS-modulated with the common spread code and the process is completed (step U10). The processes in steps U9 and U10 are identical to those in steps T4 and T5 described in FIG. 7.

In the embodiment described above, it is assumed the frequency channel selection key is not provided with the terminal. However, it is apparent that the frequency channel selection key can be provided with the terminal. If the terminal has the frequency channel selection key, it is preferable that the search result for the frequency channels is displayed on the operation and display section 30. For instance, in the signal reception process in FIG. 6, if it is decided in step S4 that the searches for all the frequency channels are ended, the process directly returns to step S1. But, in such case, the process can return to step S1 after the search results stored in the memory 31 is displayed in the operation and display section 30. In this case, if all the frequency channels are occupied by the maximum communication signals in tolerance limit, this fact is displayed and, if not, it is desirable that the least occupied frequency number is displayed.

It may be designed that, when the frequency channel search key is operated, the frequency channel can be searched and the result thereof can be displayed. Referring to FIG. 8, the process in this case will be discussed below.

The search key is operated in step U2 and it is determined that the searches for all the frequency channels are ended in step U6, the search result information stored in step U3 can be displayed instead of the processes in steps U8 to U10. The same contents of the display results can be used as the display contents in the signal reception process described above.

As described above, in the spread spectrum communication system of the first embodiment, therefore, each terminal periodically inserts a communication signal, undergone spread modulation with the system ID common spread code representing a system to which that terminal belongs, in a communication signal output from the terminal, and the other terminals of the system, when starting communication, detect a communication signal, modulated with the common spread code, from the received signal, and detect the number of spread spectrum spread signals occupying each communication channel from the result of the detection of the communication signal. Therefore, each terminal can find out the occupying state of each communication channel. As compared with the conventional spread spectrum communication system which has some difficulty to detect, beforehand, the occupying state of a frequency channel at each terminal so that an interference signal is likely to be produced in communication between terminals of the system, and in which communication may be disabled particularly if the transmission distance is large, this embodiment can perform data communication by selecting and using a highly reliable communication channel which is less likely to be occupied by the other communication signals, thereby surely preventing communication from being disabled by an interference signal and improving the system reliability.

The use of the aforementioned signal format can relax the relation between the period of the spread spectrum signal and the length of one data symbol, which has conventionally been used. More specifically, instead of setting one data symbol as one period of the spread code as in the prior art, the period of the common spread code may be treated as one period of the spread code.

Generally, the longer the period of the spread code, the greater the synchronization supplement time for the spread code becomes. In this case too, the common spread code is a relatively short code so that the synchronization supplement time can be shortened. The advantage of making the period of the spread code longer is that the types of codes can be increased and the confidentiality of the spread code can be improved.

Although the first embodiment has been described with reference to the terminal that has multiple frequency channels, the present invention may be adapted to a terminal which has a plurality of time slots instead of frequency channels.

Figure 9:
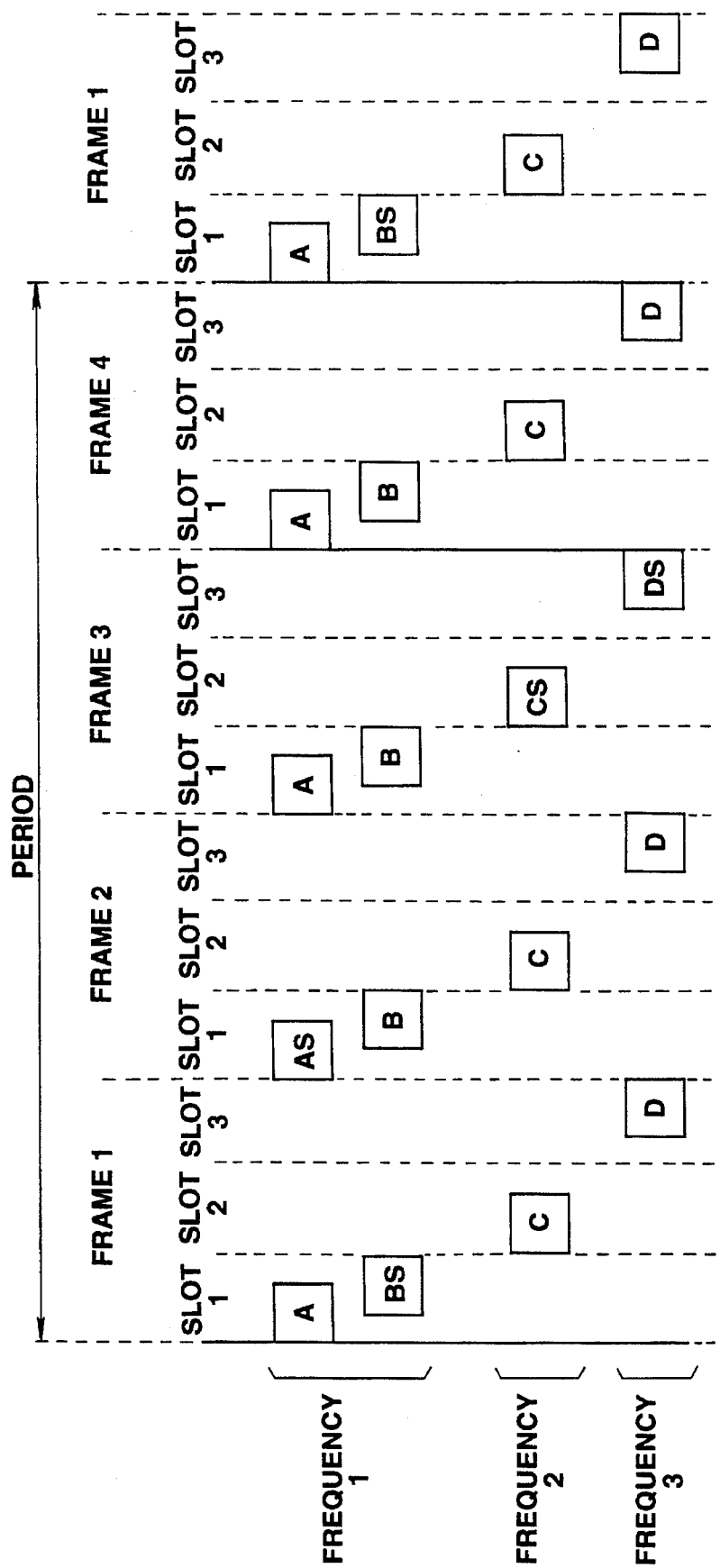
FIG. 9 is a diagram for explaining a second embodiment of the present invention.

FIG. 9 shows a structure of the spread spectrum communication system of the second embodiment of the present invention in which each frame is divided into three time slots. For each time slot, 4-system communication with the signals A, B, C and D is performed and signals AS, BS, CS and DS, modulated with the common spread codes are inserted with four frames as one period for the respective signals A, B, C and D. In this case, it is assumed that the signal A and signal B occupy the same band and same time to communication for slot 1, communication of the signal C alone is executed for slot 2, and communication of the signal D alone is executed for slot 3. When the sequence of spread codes of the signal A differs from that of the signal B even if the signals A and B are multiplexed in slot 1, the signal A can be distinguished from the signal B due to the fundamental characteristics of the spread spectrum communication. By periodically inserting a common spread code in a communication signal and observing one period of frames, it is possible to find out how many spread spectrum signals occupy each slot. As a result, it is possible to find out the optimal slot for communication. In the second embodiment in FIG. 9, since slot 1 is occupied by two signals, slot 2 by one signal and slot 3 by one signal, it is apparent that either slot 2 or slot 3 is the proper one for communication.

The second embodiment can have the same advantages as the previous first embodiment of the present invention.

According to the present invention, in short, a terminal that is about to start communication can know the occupying state of each communication channel by detecting the number of spread spectrum signals that occupy each communication channel from the result of the detection of a communication signal modulated with a common spread code, and can select a highly-reliable communication channel which is less occupied by other communication signals in executing communication. It is therefore possible to prevent the occurrence of an interference signal in communication performed by each terminal in the system, surely prevent the communication from being disabled and improve the system reliability.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A spread spectrum communication system comprising a plurality of terminals, for allowing said plurality of terminals to communicate with each other, with a communication channel comprised of at least one frequency band being shared in time and space by said terminals, each of said terminals including:

first modulating means for spread-modulating a communication signal with an individual spread code used for individual communication;

second modulating means for spread-modulating the communication signal with a common spread code which is specific to a system to which each of said plurality of terminals belongs;

means for sending the communication signal;

means for receiving the communication signal;

first demodulating means for demodulating the communication signal received by said receiving means, with the individual spread code;

second demodulating means for demodulating the communication signal received by said receiving means, with the common spread code; and means for determining how busy communication channels are on the basis of results of demodulation performed by the second demodulating means;

wherein:

when each of said plurality of terminals is communicating with another terminal, said each of the plurality of terminals exchange signals, which are spread-modulated with the individual spread code, with said another terminal, and further transmits a signal which is spread-modulated with the common spread code in a predetermined period; and when each of said plurality of terminals is not communicating with another terminal, said each of the plurality of terminals demodulates the signal received by the receiving means so as to determine how busy the communication channels are.

2. A system according to claim 1, wherein said communication channels have different frequency bands, and said second demodulating means performs demodulation of a reception signal for each of the communication channels.

3. A system according to claim 1, wherein said communication channels use said at least one frequency band in a time-divisional manner, and said second demodulating means performs demodulation of a reception signal for each of the communication channels.

4. A method for providing information regarding how busy communication channels are, said method being applied to a spectrum spread communication system comprising a plurality of terminals which perform communication by use of radio signals of a same frequency band, said method comprising the steps of:

causing communicating terminals, which are among said terminals and communicate with each other, to exchange radio signals which are spread-modulated with respective individual spread codes, and to simultaneously transmit a radio signal which is spread-modulated with a common spread code that is common to all of said terminals; and causing non-communicating terminals, which do not participate in communication, to receive a radio signal and decode the received radio signal by use of the common spread code, providing the information regarding how busy the communication channels are on the basis of results of demodulation.

5. A method, for use in a spread spectrum communication system comprising a plurality of terminals, for causing non-communicating terminals to recognize how busy communication channels are, said plurality of terminals communicating with each other, with a communication channel comprised of at least one frequency band being shared in time and space, each of said terminals including:

means for spread-modulating a transmission signal with an individual spread code;

means for spread-modulating the transmission signal with a common spread code which is common to said plurality of terminals;

means for demodulating a reception signal with the individual spread code; and means for demodulating the reception signal with the common spread code, said method comprising the steps of:

causing each of communicating terminals, which are performing communication with another, to periodically transmit a communication signal which is spread-modulated with the common spread code, independently of a communication signal which is spread-modulated with an individual spread code;

causing each of non-communicating terminals to receive a signal from the communication channels and to demodulate the signal with a common spread code which is common to the terminals of the system; and causing each of non-communicating terminals to recognize how busy the communication channels are on the basis of results of said demodulation.

6. A method according to claim 5, further comprising the step of:

displaying information indicative of how busy the communication channels are.

7. A method for communication in a spread spectrum communication system comprising a plurality of terminals which use the same frequency band of radio signals to communicate with each other, said method comprising the steps of:

causing communicating terminals, which are among said terminals and communicate with each other, to exchange radio signals which are spread-modulated with respective individual spread codes, and to simultaneously transmit a radio signal which is spread-modulated with a common spread code that is common to all of said terminals; and causing non-communicating terminals, which do not participate in communication, to receive a radio signal before start of a communication, to decode the received radio signal by use of the common spread code, and to control the start of the communication on the basis of a result of demodulation.

8. A method according to claim 7, wherein a "not busy" communication channel is selected in the step of causing the non-communicating terminals to control the start of the communication.

9. A method for permitting terminals, which do not participate in communication, to start a communication, said method being applied to a spectrum spread communication system comprising terminals which perform communication by use of radio signals of a same frequency band and each of which includes:

first means for spread-modulating transmission signals with respective individual spread codes;

second means for spread-modulating the transmission signals with a common spread code which is common to the transmission signals;

third means for demodulating reception signals with respective individual spread codes; and fourth means for demodulating the reception signals with the common spread code;

said spectrum spread communication system being a system wherein terminals communicate with each other by periodically transmitting not only signals spread-modulated by the first means but also signals spread-modulated by the second means;

said method comprising the steps of:
detecting whether or not there is a signal obtained by demodulating a received radio signal by the fourth means and spread-modulated with the common spread code;
detecting how busy communication channels are on the basis of results of said signal detection, and storing resultant detection data;
setting an identification number used for identifying a target terminal with reference to which communication is to be performed;
designating start of the communication by means of a call key;
selecting a "not busy" communication channel on the basis of the stored detection data; and
sending a signal including the identification number to a selected communication channel.

10. A method for permitting terminals, which do not participate in communication, to start a communication, said method being applied to a spectrum spread communication system comprising terminals which perform communication by use of radio signals of a same frequency band and each of which includes:

first means for spread-modulating transmission signals with respective individual spread codes;

second means for spread-modulating the transmission signals with a common spread code which is common to the transmission signals;

third means for demodulating reception signals with respective individual spread codes; and fourth means for demodulating the reception signals with the common spread code;

said spectrum spread communication system being a system wherein terminals communicate with each other by periodically transmitting not only signals spread-modulated by the first means but also signals spread-modulated by the second means;

said method comprising the steps of:
setting an identification number used for identifying a target terminal with reference to which communication is to be performed;
designating start of the communication by means of a call key;
receiving a radio signal upon reception of an instruction designating the start of communication;
causing the fourth means to demodulate the received radio signal;
detecting whether or not there is a signal which is spread-modulated with the common spread code;
detecting how busy communication channels are on the basis of results of said signal detection; and
sending a signal including said identification number to a selected communication channel.

11. A method for permitting terminals, which do not participate in communication, to start a communication, said method being applied to a spectrum spread communication system comprising terminals which perform communication by use of radio signals of a same frequency band and each of which includes:

first means for spread-modulating transmission signals with respective individual spread codes;

second means for spread-modulating the transmission signal with a common spread code which is common to the transmission signals;

third means for demodulating reception signals with respective individual spread codes; and fourth means for demodulating the reception signals with the common spread code;

said spectrum spread communication system being a system wherein terminals communicate with each other by periodically transmitting not only signals spread-modulated by the first means but also signals spread-modulated by the second means;

said method comprising the steps of:
setting a terminal number used for identifying a target terminal with reference to which communication is to be performed;
designating start of the communication by means of a call key;
receiving a radio signal upon reception of an instruction designating the start of communication;
causing the fourth means to demodulate the received radio signal;
decoding a terminal number involved in the received radio signal;
checking the decoded terminal number with the set terminal number, and determining whether or not a target terminal with reference to which communication is requested is performing communication;

sending a message when it is determined that the target terminal is performing communication; and sending a signal including the set terminal number when it is determined that the target terminal is not performing communication.

12. A communication terminal which is for use in a spectrum spread communication system and which performs communication with another communication terminal by use of a signal spread-modulated with an individual spread code, said communication terminal comprising:

first modulating means for spread-modulating a transmission signal with an individual spread code used for individual communication;

second modulating means for spread-modulating the transmission signal with a common spread code which is common to communication terminals belonging to the system;

means for sending a spread-modulated signal;

means for receiving the spread-modulated signal;

first demodulating means for demodulating the signal received by said receiving means with the individual spread code, so as to demodulate the signal transmitted by said another communication terminal;

second demodulating means for demodulating the signal received by said receiving means with the common spread code, so as to detect a signal which is modulated with the common spread code and which is output from said another communication terminal; and means for determining how busy a communication channel means is on the basis of results of demodulation performed by the second demodulating means, wherein:

when said terminal is communicating with said another terminal, said terminal exchanges signals which are spread-modulated with the individual spread code with said another terminal, and further transmits a signal which is spread-modulated with the common spread code in a predetermined period; and when said terminal is not communicating with said another terminal, said terminal demodulates the signal received by the receiving means so as to determine how busy the communication channel means is.

13. A communication terminal according to claim 12, wherein said determining means includes means for detecting whether or not a communication signal is present, on the basis of a level of the signal demodulated by the second demodulating means.

14. A communication terminal according to claim 13, further comprising:

means for comparing a terminal number involved in the signal demodulated by the second demodulating means with a terminal number of the communication terminal, so as to detect coincidence, and for outputting a response signal when the coincidence is detected.

15. A communication terminal according to claim 12, further comprising means for providing information regarding how busy the communication channel is.

16. A communication terminal according to claim 12, wherein said communication channel includes a plurality of communication channels, and there is further provided means for providing information regarding how busy the communication channels are.

17. A communication terminal according to claim 16, further comprising:

means for storing data regarding how busy the communication channels are;

means for setting a terminal number used for identifying a communication signal for which communication is performed;

means for instructing start of the communication; and means for selecting one of the communication channels on the basis of the data stored in the storing means and representing how the communication channels are used.

18. A communication terminal according to claim 17, further comprising:

means for comparing a terminal number involved in the signal demodulated by the second demodulating means with the terminal number set by the setting means, so as to detect coincidence, and for, when the coincidence is detected, executing at least one of the following steps:

(i) providing information representing that the communication with another terminal is impossible; and (ii) stopping the communication.

19. A communication terminal according to claim 12, further comprising:

means for setting a terminal number used for identifying a communication terminal for which communication is performed;

means for instructing start of the communication; and means for selecting one of the communication channels and starting the communication;

said determination means being activated by the instructing means; and said selecting means selecting a communication channel in which signals are not likely to mix with each other, on the basis of how the communication channels are used.

20. A communication terminal according to claim 19, further comprising:

means for comparing a terminal number involved in the signal demodulated by the second demodulating means with the terminal number set by the setting means, so as to detect coincidence, and for, when the coincidence is detected, executing at least one of the following steps:

(i) providing information representing that the communication with said another terminal is impossible; and (ii) stopping the communication.

* * * * *